US012634923B2

(12) United States Patent
Zhang

(10) Patent No.: US 12,634,923 B2
(45) Date of Patent: May 19, 2026

(54) METHOD AND DEVICE IN NODES USED FOR WIRELESS COMMUNICATION

(71) Applicant: Apogee 5G Global, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 312 days.

(21) Appl. No.: 17/880,620

(22) Filed: Aug. 3, 2022

(65) Prior Publication Data

US 2022/0377765 A1    Nov. 24, 2022

Related U.S. Application Data

(63) Continuation of application No. PCT/CN2021/075181, filed on Feb. 4, 2021.

(30) Foreign Application Priority Data

Feb. 19, 2020    (CN) .......................... 202010102364.6

(51) Int. Cl.
*H04W 72/12* (2023.01)
*H04L 1/18* (2023.01)
(Continued)

(52) U.S. Cl.
CPC ....... *H04W 72/1263* (2013.01); *H04L 1/1812* (2013.01); *H04L 5/0046* (2013.01); *H04W 72/569* (2023.01)

(58) Field of Classification Search
CPC ... H04W 28/04; H04W 72/04; H04W 72/042; H04W 88/08; H04W 72/1263;
(Continued)

(56) References Cited

U.S. PATENT DOCUMENTS 11,716,706 B2 *  8/2023  Liu ........................ H04W 72/02
                                                    370/329
2012/0236812 A1 *  9/2012  Chen ..................... H04W 72/23
                                                    370/329
(Continued)

FOREIGN PATENT DOCUMENTS

CN          106797283  A  *  5/2017  ........... H04L 1/1812
CN          108632966  A  *  10/2018  .......... H04W 52/146
(Continued)

OTHER PUBLICATIONS

3GPP TSG RAN WG1 #97, Reno, USA, May 13-17, 2019, R1-1907777, Source: OPPO, Title: Summary#2 on UCI enhancements for URLLC, Agenda Item: 7.2.6.2. (Year: 2019).*
(Continued)

*Primary Examiner* — Nicholas A Jensen
*Assistant Examiner* — Sanjay K Dewan
(74) *Attorney, Agent, or Firm* — Volpe Koenig

(57) ABSTRACT

A first receiver receives a first signal group and a first signaling; and a first transmitter transmits a second signal in a first time-frequency resource, the second signal carries a first bit block and a second bit block; wherein the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

20 Claims, 4 Drawing Sheets

(51) Int. Cl.

| | | |
|---|---|---|
| *H04L 1/1812* | (2023.01) | |
| *H04L 5/00* | (2006.01) | |
| *H04W 72/1263* | (2023.01) | |
| *H04W 72/566* | (2023.01) | |

(58) Field of Classification Search
CPC ............ H04W 72/569; H04W 72/1242; H04L
5/0007; H04L 1/1812; H04L 5/0046
USPC .......................................................... 370/329
See application file for complete search history.

(56) References Cited

U.S. PATENT DOCUMENTS

| | | | | |
|---|---|---|---|---|
| 2012/0307758 A1* | 12/2012 | Moon | ................... | H04L 5/0053 |
| | | | | 370/329 |
| 2015/0208404 A1* | 7/2015 | Yie | ....................... | H04W 76/15 |
| | | | | 370/329 |
| 2023/0106098 A1* | 4/2023 | Wang | .................... | H04L 1/1854 |
| | | | | 370/329 |

FOREIGN PATENT DOCUMENTS

| | | | | | |
|---|---|---|---|---|---|
| CN | 109039550 A | * | 12/2018 | ............... | H04L 1/18 |
| CN | 110167186 A | * | 8/2019 | ............... | H04W 72/04 |
| CN | 110536464 A | * | 12/2019 | ........... | H04L 1/1812 |
| CN | 110708146 A | * | 1/2020 | ............... | H04L 1/18 |
| WO | WO 2020/033941 A1 | * | 2/2020 | ............ | H04W 72/12 |

OTHER PUBLICATIONS

3GPP TSG RAN WG1 Meeting #99, Reno, Nevada, USA, Nov. 18-Nov. 22, 2019, R1-1912940, Agenda Item: 7.2.2.2.3, Source: Qualcomm Inc., Title: Enhancements to Scheduling and HARQ operation for NR-U. (Year: 2019).*

3GPP TS 38.214 v16.0.0 (Dec. 2019), Technical Specification, 3rd Generation Partnership Project; Technical Specification Group Radio Access Network; NR; Physical layer procedures for data (Release 16). (Year: 2019).*

3GPP TS 38.212 v16.0.0 (Dec. 2019), Technical Specification, 3rd Generation Partnership Project; Technical Specification Group Radio Access Network; NR; Multiplexing and channel coding (Release 16). (Year: 2019).*

3GPP TS 38.213 v16.0.0 (Dec. 2019), Technical Specification, 3rd Generation Partnership Project; Technical Specification Group Radio Access Network; NR; Physical layer procedures for control (Release 16). (Year: 2019).*

SR received in application No. PCT/CN2021/075181 dated Apr. 2, 2021.

OPPO."Summary#2on UCI Enhancements for URLLC" 3GPP TSG RAN WGI #97 R1-1907777,May 17, 2019 (May 17, 2019),entire document.

<3GPP tsg_ran\wg1_rl1> Nokia R1-1912512 "On UCI Enhancements for NRURLLC".

SR received in application No. 202010102364.6 dated Jan. 13, 2022.

1st Office Action received in application No. 202010102364.6 dated Jan. 25, 2022.

Notification to Grant patent right for invention received in application No. 202010102364.6 dated Jun. 24, 2022.

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

* cited by examiner

METHOD AND DEVICE IN NODES USED FOR WIRELESS COMMUNICATION

CROSS REFERENCE TO RELATED APPLICATIONS

This application is the continuation of the International patent application No. PCT/CN2021/075181, filed on Feb. 4, 2021, which claims the priority benefit of Chinese Patent Application No. 202010102364.6, filed on Feb. 19, 2020, the full disclosure of which is incorporated herein by reference.

BACKGROUND

Technical Field

The present application relates to transmission methods and devices in wireless communication systems, and in particular to a method and device of radio signal transmission in a wireless communication system supporting cellular networks.

Related Art

In 5G systems, in order to support more demanding Ultra Reliable and Low Latency Communication (URLLC) traffic, for example, with higher reliability (e.g., a target BLER of $10^{\wedge}-6$) or with lower latency (e.g., 0.5-1 ms), a study item (SI) of URLLC advancement in New Radio (NR) was approved at 3rd Generation Partner Project (3GPP) Radio Access Network (RAN) #80 Plenary. In order to support requirements of the higher reliability and lower latency of URLLC traffic, 3GPP has agreed to introduce data transmission and Uplink Control Information (UCI) feedback with different priorities into the URLLC.

SUMMARY

In the discussion of NR URLLC, 3GPP has introduced priority information (comprising high priority and low priority) to support transmission of different types of control information and data. In 3GPP Release 15, UCI (especially Hybrid Automatic Repeat reQuest (HARQ) feedback information) can be multiplexed with data onto a same channel (such as a Physical Uplink Shared CHannel (PUSCH)) to improve the system efficiency. However, how to reasonably multiplex control information and data with different priorities is a problem to be solved.

To address the above problem, the present application provides a solution. It should be noted that though the present application only took the NR URLLC scenario for example in the statement above; this application is also applicable to other scenarios other than NR URLLC confronting similar problems, where similar technical effects can be achieved. If no conflict is incurred, embodiments in any node in the present application and the characteristics of the embodiments are also applicable to any other node, and vice versa. And the embodiments in the present application and the characteristics in the embodiments can be arbitrarily combined if there is no conflict. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receiving a first signal group and a first signaling; and transmitting a second signal in a first time-frequency resource, the second signal carrying a first bit block and a second bit block;

herein, the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, a problem to be solved in the present application includes: when UCI and data with different priorities are multiplexed onto a PUSCH, how to effectively ensure the transmission performance of a high-priority control signaling and high-priority data.

In one embodiment, characteristics of the above method include: low-priority information (comprising low-priority control information or low-priority data) and high-priority information (comprising high-priority control information or high-priority data) can be multiplexed into a same channel.

In one embodiment, characteristics of the above method include: when low-priority Hybrid Automatic Repeat reQuest ACKnowledgement (HARQ-ACK) information and high-priority data are multiplexed onto a PUSCH, a number of bit(s) of low-priority HARQ-ACK information carried by the PUSCH is limited; if a number of bit(s) of low-priority HARQ-ACK information is greater than a certain specific value, low-priority HARQ-ACK information will be mapped onto PUSCH resources after being compressed.

In one embodiment, characteristics of the above method include: when HARQ-ACK information and data with high-priorities are multiplexed onto a same PUSCH, the PUSCH carries all bits of the high-priority HARQ-ACK information.

In one embodiment, advantages of the above method include: when low-priority HARQ-ACK information and high-priority data are multiplexed onto a PUSCH, the reliable transmission of high-priority data is ensured by limiting low-priority HARQ-ACK information carried by the PUSCH.

In one embodiment, advantages of the above method include: by limiting resources occupied by low-priority UCI on the PUSCH, more transmission resources are allocated to high-priority UCI or high-priority data.

According to one aspect of the present application, the above method is characterized in that the second signal comprises a first sub-signal, the first sub-signal is a signal generated by the first bit block after through a first procedure, the first procedure comprises channel coding.

According to one aspect of the present application, the above method is characterized in that the first time-frequency resource comprises a first reserved resource, and a priority of the third bit block and a priority of the second bit block are used together to determine whether the first sub-signal is transmitted in time-frequency resources other than the first reserved resource.

In one embodiment, characteristics of the above method include: when a number of HARQ-ACK information bit(s) to be fed back is large (for example, greater than 2), high-priority HARQ-ACK information is mapped onto the PUSCH through rate matching; low priority HARQ-ACK information is mapped onto reserved resources (such as reserved RE) after being compressed.

In one embodiment, advantages of the above method include: the rate matching of high-priority information (comprising high-priority control information or high-priority data) is not dependent on a transmission of low-priority control information; the impact on high-priority information resulting from a failure of a low-priority PDCCH reception is reduced.

According to one aspect of the present application, comprising:

receiving a first signaling group;

herein, the first signaling group comprises scheduling information of the first signal group, a second signaling is a last signaling in the first signaling group, the second signaling indicates a second time-frequency resource, and the second time-frequency resource is overlapping with the first time-frequency resource in time domain.

According to one aspect of the present application, comprising:

receiving a second signal group;

herein, the second signal carries a fourth bit block, a fifth bit block comprises indication information of whether a signal in the second signal group is correctly received, the fifth bit block is used to generate the fourth bit block, a priority of the third bit block and a priority of the fifth bit block are different, and the fifth bit block and the third bit block are used together to determine the first bit block.

In one embodiment, characteristics of the above method include: a high-priority HARQ-ACK Codebook (CB) and a low-priority HARQ-ACK CB are used together to determine a number of HARQ-ACK information bit(s) with a low priority transmitted in a PUSCH.

According to one aspect of the present application, the above method is characterized in that the fifth bit block and the third bit block are used together to determine the fourth bit block.

In one embodiment, characteristics of the above method include: a high-priority HARQ-ACK CB and a low-priority HARQ-ACK CB are used together to determine a number of HARQ-ACK information bit(s) with a high priority transmitted in a PUSCH.

In one embodiment, characteristics of the above method include: when a number of bits comprised in a high-priority HARQ-ACK CB and a number of bits comprised in a low-priority HARQ-ACK CB are large, a high-priority HARQ-ACK CB and a low-priority HARQ-ACK CB are mapped onto a PUSCH after being compressed.

According to one aspect of the present application, comprising:

a number of bit(s) comprised in the third bit block is greater than a first value; when the third bit block is a low priority and the second bit block is a high priority, the first sub-signal is only transmitted in the first reserved resource; otherwise, the first sub-signal is transmitted in time-frequency resources other than the first reserved resource.

According to one aspect of the present application, wherein the first node is a UE.

According to one aspect of the present application, wherein the first node is a relay node.

The present application provides a method in a second node for wireless communications, comprising:

transmitting a first signal group and a first signaling; and receiving a second signal in a first time-frequency resource, the second signal carrying a first bit block and a second bit block;

herein, the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

According to one aspect of the present application, the above method is characterized in that the second signal comprises a first sub-signal, the first sub-signal is a signal generated by the first bit block after through a first procedure, the first procedure comprises channel coding.

According to one aspect of the present application, the above method is characterized in that the first time-frequency resource comprises a first reserved resource, and a priority of the third bit block and a priority of the second bit block are used together to determine whether the first sub-signal is transmitted in time-frequency resources other than the first reserved resource.

According to one aspect of the present application, the above method is characterized in that transmitting a first signaling group;

herein, the first signaling group comprises scheduling information of the first signal group, a second signaling is a last signaling in the first signaling group, the second signaling indicates a second time-frequency resource, and the second time-frequency resource is overlapping with the first time-frequency resource in time domain.

According to one aspect of the present application, the above method is characterized in that transmitting a second signal group;

herein, the second signal carries a fourth bit block, a fifth bit block comprises indication information of whether a signal in the second signal group is correctly received, the fifth bit block is used to generate the fourth bit block, a priority of the third bit block and a priority of the fifth bit block are different, and the fifth bit block and the third bit block are used together to determine the first bit block.

According to one aspect of the present application, comprising:

the fifth bit block and the third bit block are used together to determine the fourth bit block.

According to one aspect of the present application, comprising:

a number of bit(s) comprised in the third bit block is greater than a first value; when the third bit block is a low priority and the second bit block is a high priority, the first sub-signal is only transmitted in the first reserved resource; otherwise, the first sub-signal is transmitted in time-frequency resources other than the first reserved resource.

According to one aspect of the present application, wherein the second node is a base station.

According to one aspect of the present application, wherein the second node is a UE.

According to one aspect of the present application, wherein the second node is a relay node.

The present application provides a first node for wireless communication, comprising:

a first receiver, receiving a first signal group and a first signaling; and a first transmitter, transmitting a second signal in a first time-frequency resource, the second signal carrying a first bit block and a second bit block;

herein, the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

The present application provides a second node for wireless communications, comprising:

a second transmitter, transmitting a first signal group and a first signaling; and a second receiver, receiving a second signal in a first time-frequency resource, the second signal carrying a first bit block and a second bit block;

herein, the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the present application has the following advantages over conventional schemes:

when low-priority HARQ-ACK information and high-priority data are multiplexed onto a PUSCH, the reliable transmission of high-priority data is ensured by limiting low-priority HARQ-ACK information carried by the PUSCH;

by limiting resources occupied by low-priority UCI on the PUSCH, more transmission resources are allocated to high-priority UCI or high-priority data;

the rate matching of high-priority information (comprising high-priority control information or high-priority data) is not dependent on a transmission of low-priority control information; the impact on high-priority information resulting from a failure of a low-priority PDCCH reception is reduced.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
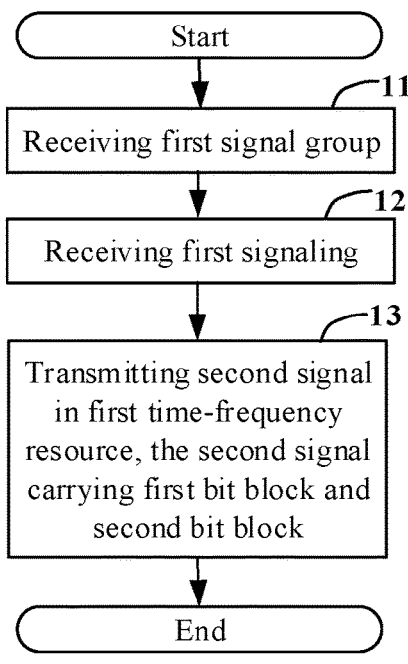
FIG. 1 illustrates a flowchart of the processing of a first node according to one embodiment of the present application.

Embodiment 1 illustrates a flowchart of processing of a first node according to one embodiment of the present application, as shown in FIG. 1.

In embodiment 1, the first node in the present application receives a first signal group in step 11; receives a first signaling in step 12; and transmits a second signal in a first time-frequency resource in step 13.

In embodiment 1, the sequential order of steps 11 and 12 in FIG. 1 does not necessarily mean that the steps are chronologically arranged.

In embodiment 1, the second signal carries a first bit block and a second bit block; the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the first signal group comprises at least one baseband signal.

In one embodiment, the first signal group comprises at least one radio signal.

In one embodiment, the second signal is a baseband signal.

In one embodiment, the second signal is a radio signal.

In one embodiment, the first signal group comprises at least one Radio Frequency (RF) signal.

In one embodiment, the second signal is an RF signal.

In one embodiment, the first signaling is dynamically configured.

In one embodiment, the first signaling is a physical-layer signaling.

In one embodiment, the first signaling is a Downlink Control Information (DCI) signaling.

In one embodiment, the first signaling is a DCI signaling of a Downlink Grant.

In one embodiment, the first signaling is transmitted on a downlink physical layer control channel (i.e., a downlink channel only capable of carrying a physical layer signaling)

In one embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, each signal in the first signal group is transmitted on a downlink physical layer data channel (i.e., a downlink channel capable of carrying physical-layer data).

In one subembodiment of the above embodiment, the downlink physical layer data channel is a Physical Downlink Shared CHannel (PDSCH).

In one subembodiment of the above embodiment, the downlink physical layer data channel is a short PDSCH (sPDSCH).

In one subembodiment of the above embodiment, the downlink physical layer data channel is a New Radio PDSCH (NR-PDSCH).

In one subembodiment of the above embodiment, the downlink physical layer data channel is a Narrow Band PDSCH (NB-PDSCH).

In one embodiment, the first signaling is DCI format 1_0, and for specific meaning of the DCI format 1_0, refer to section 7.3.1.2 in 3GPP TS38.212.

In one embodiment, the first signaling is DCI format 1_1, and for specific meaning of the DCI format 1_1, refer to section 7.3.1.2 in 3GPP TS38.212.

In one embodiment, the first signal group comprises M signals, and the third bit block comprises indication information of whether each of the M signals are correctly received.

In one embodiment, the third bit block is a HARQ-ACK CB, and for the generation method of the third bit block, refer to section 9.1 in 3GPP TS38.213.

In one embodiment, a number of bit(s) comprised in the third bit block is used to select a first time-frequency resource group out of N time-frequency resource group(s).

In one subembodiment of the above embodiment, the N time-frequency resource group(s) is(are) N PUCCH resource set(s), and the first time-frequency resource group is one of the N PUCCH resource set(s).

In one subembodiment of the above embodiment, the first time-frequency resource group is a PUCCH resource set, and the second time-frequency resource is a PUCCH resource in the first time-frequency resource group.

In one embodiment, the third bit block is used to generate the first bit block through the method of boundling.

In one embodiment, all or partial bits in the third bit block generates the first bit block through logic and operation.

In one embodiment, the first bit block comprises the third bit block.

In one embodiment, the second bit block comprises UE data.

In one embodiment, the second bit block comprises UE data, and the first bit block comprises a control signaling.

In one embodiment, a maximum number of bit(s) of the first bit block allowed to be carried on the first time-frequency resource is greater than the first value in the present application.

In one embodiment, a maximum number of bit(s) of the first bit block allowed to be carried by the second signal is greater than the first value in the present application.

In one embodiment, a number of bit(s) comprised in the third bit block is greater than the first value in the present application; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is less than a number of bit(s) comprised in the third bit block.

In one embodiment, a number of bit(s) comprised in the third bit block is greater than the first value in the present application, and a maximum number of bit(s) of the first bit block allowed to be carried on the first time-frequency resource is greater than the first value; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is less than a number of bit(s) comprised in the third bit block.

In one embodiment, a number of bit(s) comprised in the third bit block is greater than the first value in the present application; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is equal to the first value.

In one embodiment, a number of bit(s) comprised in the third bit block is greater than the first value in the present application, and a maximum number of bit(s) of the first bit block allowed to be carried on the first time-frequency resource is greater than the first value; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is equal to the first value.

In one embodiment, a number of bit(s) comprised in the third bit block is greater than the first value in the present application; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is equal to the first value; otherwise, a number of bit(s) comprised in the first bit block (a size of the first bit block) is equal to a number of bit(s) comprised in the third bit block.

In one embodiment, a number of bit(s) comprised in the third bit block is greater than the first value in the present application, and a maximum number of bit(s) of the first bit block allowed to be carried on the first time-frequency resource is greater than the first value; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is equal to the first value; otherwise, a number of bit(s) comprised in the first bit block (a size of the first bit block) is equal to a number of bit(s) comprised in the third bit block.

In one embodiment, a number of bit(s) comprised in the third bit block is greater than the first value in the present application; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is equal to the first value; otherwise, a number of bit(s) comprised in the first bit block (a size of the first bit block) is greater than the first value.

In one embodiment, a number of bit(s) comprised in the third bit block is greater than the first value in the present application, and a maximum number of bit(s) of the first bit block allowed to be carried on the first time-frequency resource is greater than the first value; when a priority of the third bit block is a low priority and a priority of the second bit block is a high priority, the first bit block comprises at least one bit generated by all or partial bits in the third bit block through the method of boundling, and a number of bit(s) comprised in the first bit block (a size of the first bit block) is equal to the first value; otherwise, a number of bit(s) comprised in the first bit block (a size of the first bit block) is greater than the first value.

In one embodiment, a number of bit(s) comprised in the third bit block is greater than the first value in the present application; when a priority of the third bit block is a low priority and a priority of the second bit block is a high priority, a number of bit(s) comprised in the first bit block (a size of the first bit block) is equal to the first value; otherwise, a number of bit(s) comprised in the first bit block (a size of the first bit block) is greater than the first value.

In one embodiment, a number of bit(s) comprised in the third bit block is greater than the first value in the present application, and a maximum number of bit(s) of the first bit block allowed to be carried on the first time-frequency resource is greater than the first value; when a priority of the third bit block is a low priority and a priority of the second bit block is a high priority, a number of bit(s) comprised in the first bit block (a size of the first bit block) is equal to the first value; otherwise, a number of bit(s) comprised in the first bit block (a size of the first bit block) is greater than the first value.

In one embodiment, a number of bit(s) comprised in the third bit block is not greater than the first value in the present application; when a priority of the third bit block is a low priority and a priority of the second bit block is a high priority, a number of bit(s) comprised in the first bit block (a size of the first bit block) is not greater than the first value.

In one embodiment, a number of bit(s) comprised in the third bit block is not greater than the first value in the present application; when a priority of the third bit block is a low priority and a priority of the second bit block is a high priority, a number of bit(s) comprised in the first bit block (a size of the first bit block) is equal to a number of bit(s) comprised in the third bit block.

In one embodiment, a number of bit(s) comprised in the third bit block is not greater than the first value in the present application; when a priority of the third bit block is a low priority and a priority of the second bit block is a high priority, the first bit block comprises the third bit block.

In one embodiment, when a priority of the third bit block is a high priority and a priority of the second bit block is a high priority, the first bit block comprises each of bit(s) in the third bit block, and a number of bit(s) comprised in the first bit block (a size of the first bit block) is equal to a number of bit(s) comprised in the third bit block.

In one embodiment, when a priority of the third bit block is a high priority and a priority of the second bit block is a low priority, the first bit block comprises each of bit(s) in the third bit block, and a number of bit(s) comprised in the first bit block (a size of the first bit block) is equal to a number of bit(s) comprised in the third bit block.

In one embodiment, when a priority of the third bit block is a low priority and a priority of the second bit block is a low priority, the first bit block comprises each of bit(s) in the third bit block, and a number of bit(s) comprised in the first bit block (a size of the first bit block) is equal to a number of bit(s) comprised in the third bit block.

In one embodiment, when a priority of the third bit block is a high priority and a priority of the second bit block is a high priority, the first bit block comprises the third bit block.

In one embodiment, when a priority of the third bit block is a high priority and a priority of the second bit block is a low priority, the first bit block comprises the third bit block.

In one embodiment, when a priority of the third bit block is a low priority and a priority of the second bit block is a low priority, the first bit block comprises the third bit block.

In one embodiment, when a priority of the third bit block is a high priority and a priority of the second bit block is a high priority, a number of bit(s) comprised in the first bit block (a size of the first bit block) is equal to a smaller value between a number of bit(s) comprised in the third bit block and a maximum number of bit(s) of the first bit block allowed to be carried on the first time-frequency resource.

In one embodiment, when a priority of the third bit block is a high priority and a priority of the second bit block is a low priority, a number of bit(s) comprised in the first bit block (a size of the first bit block) is equal to a smaller value between a number of bit(s) comprised in the third bit block and a maximum number of bit(s) of the first bit block allowed to be carried on the first time-frequency resource.

In one embodiment, when a priority of the third bit block is a low priority and a priority of the second bit block is a low priority, a number of bit(s) comprised in the first bit block (a size of the first bit block) is equal to a smaller value between a number of bit(s) comprised in the third bit block and a maximum number of bit(s) of the first bit block allowed to be carried on the first time-frequency resource.

In one embodiment, the first time-frequency resource is reserved for transmitting the second bit block.

In one embodiment, the first time-frequency resource is a time-frequency resource belonging to an uplink physical-layer data channel (i.e., an uplink channel capable of carrying physical-layer data).

In one subembodiment of the above embodiment, the uplink physical layer data channel is a Physical Uplink Shared CHannel (PUSCH).

In one subembodiment of the above embodiment, the uplink physical layer data channel is a short Physical Uplink Shared Channel (sPUSCH).

In one subembodiment of the above embodiment, the uplink physical layer data channel is a New Radio PUSCH (NR-PUSCH).

In one subembodiment of the above embodiment, the uplink physical layer data channel is a Narrow Band PUSCH (NB-PUSCH).

In one embodiment, the second signal is transmitted on an uplink physical layer data channel (that is, an uplink channel capable of carrying physical layer data).

In one subembodiment of the above embodiment, the uplink physical layer data channel is a PUSCH.

In one subembodiment of the above embodiment, the uplink physical layer data channel is an sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, the first time-frequency resource comprises at least one Resource Element (RE).

In one embodiment, the first time-frequency resource comprises at least one multicarrier symbol in time domain, and the first time-frequency resource comprises at least one subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multi-carrier symbol is a Filter Bank Multi-Carrier (FBMC) symbol.

In one embodiment, the multicarrier symbol comprises a Cyclic Prefix (CP).

In one embodiment, the first bit block comprises at least one bit.

In one embodiment, the first bit block comprises a HARQ-ACK feedback.

In one embodiment, a HARQ-ACK feedback is carried in partial bits of the first bit block.

In one embodiment, a HARQ-ACK feedback is carried in all bits of the first bit block.

In one embodiment, the second bit block comprises at least one bit.

In one embodiment, the third bit block comprises at least one bit.

In one embodiment, the third bit block comprises a HARQ-ACK feedback.

In one embodiment, all bits of the third bit block carry a HARQ-ACK CB.

In one embodiment, the first bit block comprises a Part 1 Channel State Information (CSI) Report, and for specific meaning of the Part 1 CSI Report, refer to section 5. 2. 3 in 3GPP TS38. 214.

In one embodiment, the first bit block comprises all or partial Part 2 CSI Report, and for specific meaning of the Part 2 CSI Report, refer to section 5.2.3 in 3GPP TS38. 214.

In one embodiment, the first bit block comprises bit(s) for at least one of HARQ-ACK information, a Part 1 CSI Report or a Part 2 CSI Report.

In one embodiment, the first bit block comprises a Scheduling Request (SR).

In one embodiment, the scheduling information of the second signal comprises one or more of occupied time-domain resources, occupied frequency-domain resources, an MCS, Demodulation Reference Signals configuration information, a HARQ process ID, a Redundancy Version (RV), an NDI and a priority.

Embodiment 2

Figure 2:
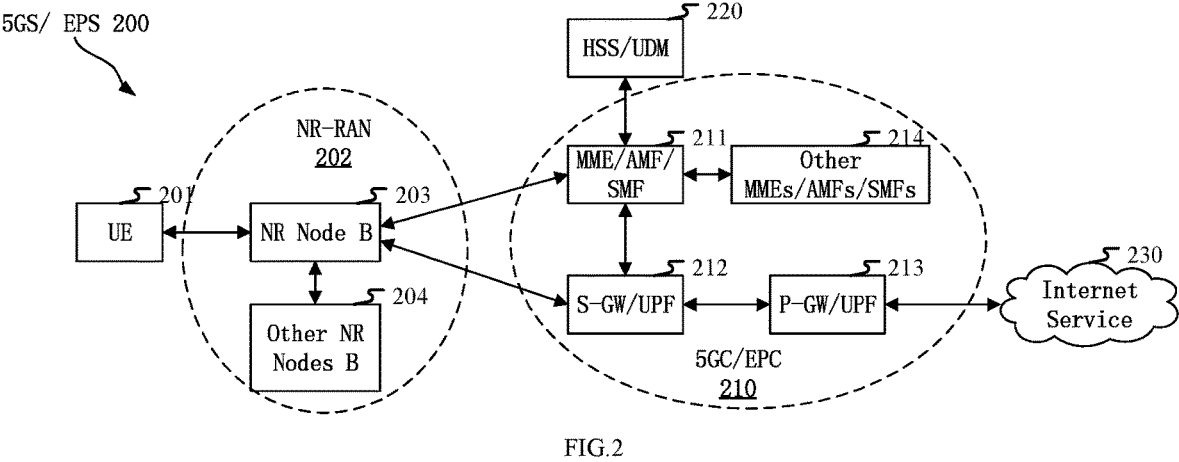
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application comprises the UE 201.

In one embodiment, the second node in the present application comprises the gNB 203.

In one subembodiment, the UE 201 supports MIMO-based wireless communications.

In one subembodiment, the gNB 203 supports MIMO-based wireless communications.

Embodiment 3

Figure 3:
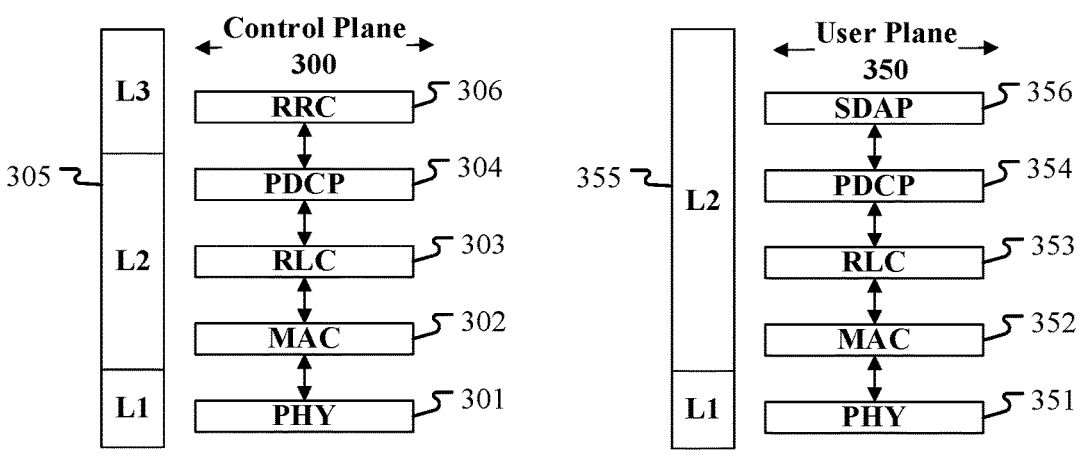
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource pool) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first bit block in the present application is generated by the RRC sublayer 306.

In one embodiment, the first bit block in the present application is generated by the MAC sublayer 302.

In one embodiment, the second bit block in the present application is generated by the RRC sublayer 306.

In one embodiment, the second bit block in the present application is generated by the MAC sublayer 302.

In one embodiment, the third bit block in the present application is generated by the RRC sublayer 306.

In one embodiment, the third bit block in the present application is generated by the MAC sublayer 302.

In one embodiment, the fourth bit block in the present application is generated by the RRC sublayer 306.

In one embodiment, the fourth bit block in the present application is generated by the MAC sublayer 302.

In one embodiment, the fifth bit block in the present application is generated by the RRC sublayer 306.

In one embodiment, the fifth bit block in the present application is generated by the MAC sublayer 302.

In one embodiment, the first signaling in the present application is generated by the PHY 301 or the PHY 351.

In one embodiment, the first signal group in the present application is generated by the PHY 301 or the PHY 351.

In one embodiment, the second signal in the present application is generated by the PHY 301 or the PHY 351.

In one embodiment, the first signaling group in the present application is generated by the PHY 301 or the PHY 351.

In one embodiment, the second signal group in the present application is generated by the PHY 301 or the PHY 351.

In one embodiment, the first sub-signal in the present application is generated by the PHY 301 or the PHY 351.

Embodiment 4

Figure 4:
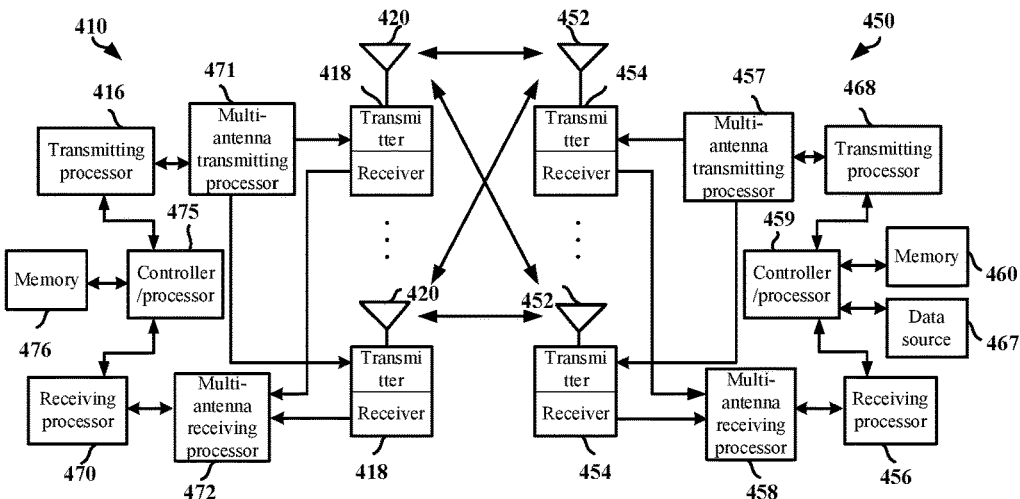
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into an RF stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signal group in the present application and the first signaling in the present application; transmits the second signal in the present application in the first time-frequency resource in the present application, and the second signal carries the first bit block in the present application and the second bit block in the present application; the first signaling comprises scheduling information of the second signal, the third bit block in the present application comprises indication information of whether a signal in the first signal group is correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the second communication device 450 comprises a memory that stores a computer readable instruction program. The computer readable instruction program generates an action when executed by at least one processor. The action includes: receiving the first signal group in the present application and the first signaling in the present application; transmitting the second signal in the present application in the first time-frequency resource in the present application, and the second signal carrying the first bit block in the present application and the second bit block in the present application; the first signaling comprises scheduling information of the second signal, the third bit block in the present application comprises indication information of whether a signal in the first signal group is correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signal group in the present application and the first signaling in the present application; receives the second signal in the present application in the first time-frequency resource in the present application, and the second signal carries the first bit block in the present application and the second bit block in the present application; the first signaling comprises scheduling information of the second signal, the third bit block in the present application comprises indication information of whether a signal in the first signal group is correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the first communication device 410 comprises a memory that stores a computer readable instruction program. The computer readable instruction program generates an action when executed by at least one processor. The action includes: transmitting the first signal group in the present application and the first signaling in the present application; receiving the second signal in the present application in the first time-frequency resource in the present application, and the second signal carrying the first bit block in the present application and the second bit block in the present application; the first signaling comprises scheduling information of the second signal, the third bit block in the present application comprises indication information of whether a signal in the first signal group is correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the first node in the present application comprises the second communication device 450.

In one embodiment, the second node in the present application comprises the first communication device 410.

In one embodiment, the second communication device 450 is a UE.

In one embodiment, the first communication device 450 is a base station.

In one embodiment, the first communication device 410 is a UE.

In one embodiment, at least one of the antenna 420, the receiver 418, the receiving processor 470, the multi-antenna receiving processor 472, the controller/processor 475, or the memory 476 is used to receive the second signal in the present application.

In one embodiment, at least one of the antenna 452, the transmitter 454, the transmitting processor 468, the multi-antenna transmitting processor 457, the controller/processor 459, the memory 460, or the data source 467 is used to transmit the second signal in the present application.

In one embodiment, at least one of the antenna 420, the receiver 418, the receiving processor 470, the multi-antenna receiving processor 472, the controller/processor 475, or the memory 476 is used to receive the first sub-signal in the present application.

In one embodiment, at least one of the antenna 452, the transmitter 454, the transmitting processor 468, the multi-antenna transmitting processor 457, the controller/processor 459, the memory 460, or the data source 467 is used to transmit the first sub-signal signal in the present application.

In one embodiment, at least one of the antenna 452, the receiver 454, the receiving processor 456, the multi-antenna receiving processor 458, the controller/processor 459, the memory 460, and the data source 467 is used to receive the first signaling in the present application.

In one embodiment, at least one of the antenna 420, the transmitter 418, the transmitting processor 416, the multi-antenna transmitting processor 471, the controller/processor 475, or the memory 476 is used to transmit the first signaling in the present application.

In one embodiment, at least one of the antenna 452, the receiver 454, the receiving processor 456, the multi-antenna receiving processor 458, the controller/processor 459, the memory 460, or the data source 467 is used to receive the first signaling group in the present application.

In one embodiment, at least one of the antenna 420, the transmitter 418, the transmitting processor 416, the multi-antenna transmitting processor 471, the controller/processor 475, or the memory 476 is used to transmit the first signaling group in the present application.

In one embodiment, at least one of the antenna 452, the receiver 454, the receiving processor 456, the multi-antenna receiving processor 458, the controller/processor 459, the memory 460, or the data source 467 is used to receive the first signaling group in the present application.

In one embodiment, at least one of the antenna 420, the transmitter 418, the transmitting processor 416, the multi-antenna transmitting processor 471, the controller/processor 475, or the memory 476 is used to transmit the first signal group in the present application.

In one embodiment, at least one of the antenna 452, the receiver 454, the receiving processor 456, the multi-antenna receiving processor 458, the controller/processor 459, the memory 460, or the data source 467 is used to receive the second signal group in the present application.

In one embodiment, at least one of the antenna 420, the transmitter 418, the transmitting processor 416, the multi-antenna transmitting processor 471, the controller/processor 475, or the memory 476 is used to transmit the second signal group in the present application.

Embodiment 5

Figure 5:
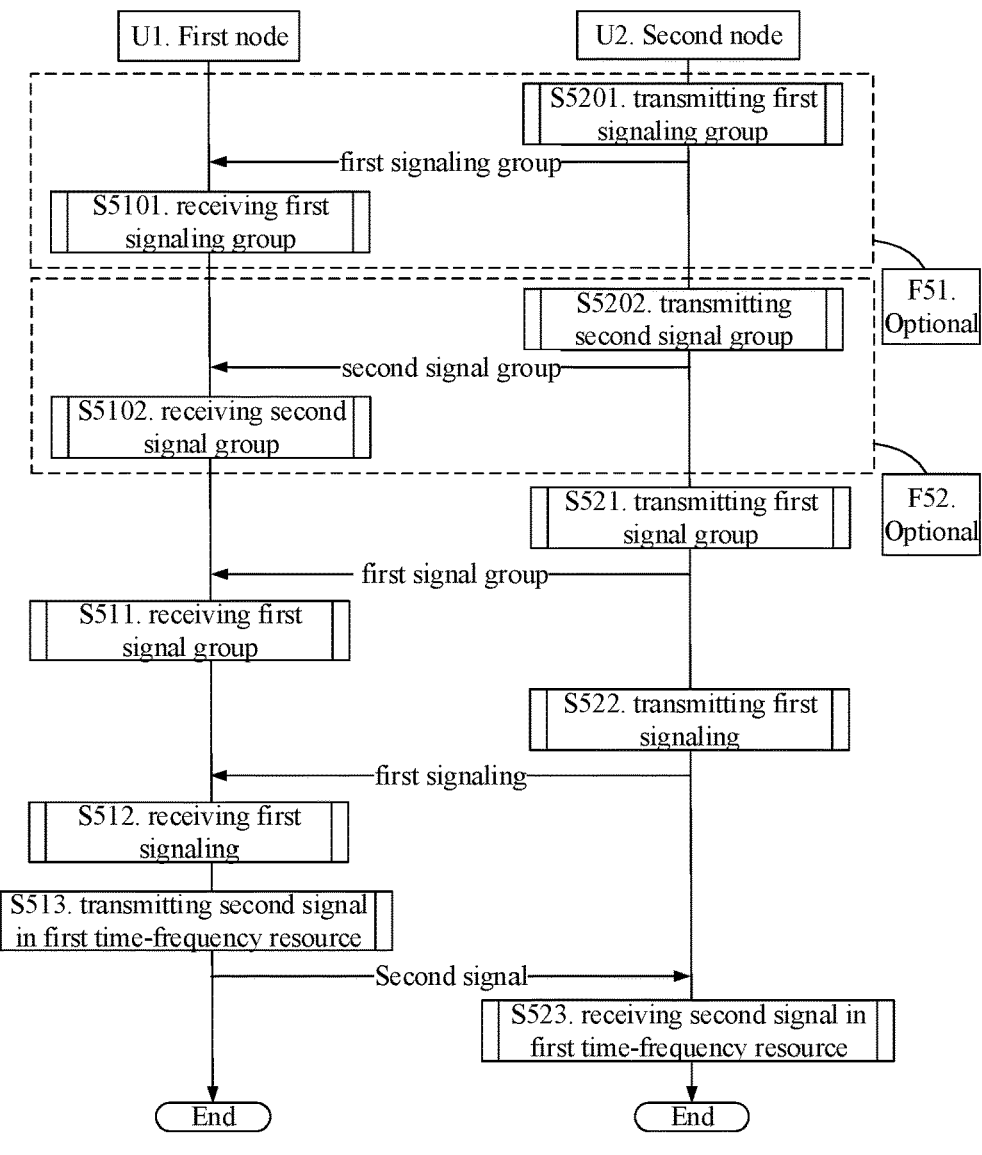
FIG. 5 illustrates a flowchart of transmission according to one embodiment of the present application.

Embodiment 5 illustrates a flowchart of wireless transmission according to one embodiment in the present application, as shown in FIG. 5. In FIG. 5, a first node U1 and a second node U2 are in communications via an air interface. The dashed boxes marked by F51 and F52 in the figure are optional.

The first node U1 receives a first signaling group in step S5101; receives a second signal group in step S5102; receives a first signal group in step S511; receives a first signaling in step S512; and transmits a second signal in a first time-frequency resource in step S513.

The first node U2 transmits a first signaling group in step S5201; transmits a second signal group in step S5202; transmits a first signal group in step S521; transmits a first signaling in step S522; and receives a second signal in a first time-frequency resource in step S523.

In embodiment 5, the sequential order of transmission and reception steps in FIG. 5 between {S5101, S5201}, {S5102, S5202}, {S511, S521} and {S512, S522} does not necessarily mean that the steps are chronologically arranged.

In embodiment 5, the second signal carries a first bit block and a second bit block; the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block); the second signal comprises a first sub-signal, the first sub-signal is a signal generated by the first bit block after through a first procedure, the first procedure comprises channel coding; the first time-frequency resource comprises a first reserved resource, a priority of the third bit block and a priority of the second bit block are used together to determine whether the first sub-signal is transmitted in time-frequency resources other than the first reserved resource; the first signaling group comprises scheduling information of the first signal group, a second signaling is a last signaling in the first signaling group, the second signaling indicates a second time-frequency resource, and the second time-frequency resource is overlapping with the first time-frequency resource in time domain.

In one embodiment, a number of bit(s) comprised in the third bit block is greater than a first value; when the third bit block is a low priority and the second bit block is a high priority, the first sub-signal is only transmitted in the first reserved resource; otherwise, the first sub-signal is transmitted in time-frequency resources other than the first reserved resource.

In one embodiment, the second signal carries a fourth bit block, a fifth bit block comprises indication information of whether a signal in the second signal group is correctly received, the fifth bit block is used to generate the fourth bit block, a priority of the third bit block and a priority of the fifth bit block are different, and the fifth bit block and the third bit block are used together to determine the first bit block; and the fifth bit block and the third bit block are used together to determine the fourth bit block.

In one embodiment, the first node U1 is the first node in the present application.

In one embodiment, the second node U2 is the second node in the present application.

In one embodiment, the first node U1 is a UE.

In one embodiment, the second node U2 is a base station.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 comprises a radio interface between a base station and a UE.

In one embodiment, the second signal group comprises at least one baseband signal.

In one embodiment, the second signal group comprises at least one radio signal.

In one embodiment, the second signal group comprises at least one RF signal.

In one embodiment, the first sub-signal is a baseband signal.

In one embodiment, the first sub-signal is a radio signal.

In one embodiment, the first sub-signal is an RF signal.

In one embodiment, each signaling in the first signaling group is dynamically configured.

In one embodiment, each signaling in the first signaling group is a physical-layer signaling.

In one embodiment, the first signaling group comprises at least one DCI signaling.

In one embodiment, the first signaling group comprises at least one DCI signaling of downlink grant.

In one embodiment, each signaling in the first signaling group is transmitted on a downlink physical-layer control channel (i.e., a downlink channel capable of carrying a physical-layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

In one embodiment, each signal in the second signal group is transmitted on a downlink physical layer data channel (i.e., a downlink channel capable of carrying physical-layer data).

In one subembodiment of the above embodiment, the downlink physical layer data channel is a PDSCH.

In one subembodiment of the above embodiment, the downlink physical layer data channel is an sPDSCH.

In one subembodiment of the above embodiment, the downlink physical layer data channel is an NR-PDSCH.

In one subembodiment of the above embodiment, the downlink physical layer data channel is an NB-PDSCH.

In one embodiment, each signaling in the first signaling group is DCI format 1_0, and for specific meaning of the DCI format 1_0, refer to section 7.3.1.2 in 3GPP TS38.212.

In one embodiment, each signaling in the first signaling group is DCI format 1_1, and for specific meaning of the DCI format 1_1, refer to section 7.3.1.2 in 3GPP TS38.212.

In one embodiment, the second time-frequency resource is reserved for transmitting the first bit block.

In one embodiment, the second time-frequency resource is a time-frequency resource belonging to an uplink physical-layer control channel (i.e., an uplink channel only capable of carrying a physical-layer signaling)

In one subembodiment of the above embodiment, the uplink physical layer control channel is a Physical Uplink Control CHannel (PUCCH).

In one subembodiment of the above embodiment, the uplink physical layer control channel is a short PUCCH (sPUCCH).

In one subembodiment of the above embodiment, the uplink physical layer control channel is a New Radio PUCCH (NR-PUCCH).

In one subembodiment of the above embodiment, the uplink physical layer control channel is a Narrow Band PUCCH (NB-PUCCH).

In one embodiment, the second time-frequency resource comprises at least one RE.

In one embodiment, the second time-frequency resource comprises at least one multicarrier symbol in time domain, and the first time-frequency resource comprises at least one subcarrier in frequency domain.

In one embodiment, the scheduling information of the first signal group comprises one or more of occupied time-domain resources, occupied frequency-domain resources, an MCS, DMRS configuration information, a HARQ process ID, an RV, an NDI and a priority.

In one embodiment, the first time-frequency resource and the second time-frequency resource are partially overlapping in time domain.

In one embodiment, the first time-frequency resource and the second time-frequency resource are completely overlapping in time domain.

In one embodiment, the first signal group comprises M signals, the first signaling group comprises M signalings, and the M signalings respectively comprise scheduling information of the M signals.

In one embodiment, each signaling in the first signaling group indicates transmitting feedback information in a first time-domain resource.

In one subembodiment of the above embodiment, the first time-domain resource is a slot.

In one subembodiment of the above embodiment, the first time-domain resource is a sub-slot.

In one subembodiment of the above embodiment, each signaling in the first signaling group comprises a PDSCH-to-HARQ_feedback timing indicator, and the PDSCH-to-HARQ_feedback timing indicator is used to determine the first time-domain resource.

In one subembodiment of the above embodiment, the feedback information comprises HARQ-ACK information.

In one embodiment, the phrase of a second signaling being a last signaling in the first signaling group comprises in time domain, a monitoring occasion of the second signaling is later than a monitoring occasion of a signaling other than the second signaling in the first signaling group.

In one embodiment, the phrase of a second signaling being a last signaling in the first signaling group comprises in time domain, a monitoring occasion of the second signaling is not earlier than a monitoring occasion of a signaling other than the second signaling in the first signaling group.

In one embodiment, the phrase of a second signaling being a last signaling in the first signaling group comprises in time domain, a last symbol in the second signaling is later than a last symbol of a signaling other than the second signaling in the first signaling group.

In one embodiment, the phrase of a second signaling being a last signaling in the first signaling group comprises in time domain, a last symbol in the second signaling is not earlier than a last symbol of a signaling other than the second signaling in the first signaling group.

In one embodiment, the phrase of a second signaling being a last signaling in the first signaling group comprises that the first signaling group comprises multiple DCIs, the multiple DCIs indicate a same time for transmitting a PUCCH, and the second signaling is a last DCI in the first signaling group.

In one embodiment, the phrase of the second time-frequency resource being overlapping with the first time-frequency resource in time domain comprises that the second time-frequency resource is a PUCCH, the first time-frequency resource is a PUSCH, the third bit block and the second signaling are used together to select the second time-frequency resource out of multiple PUCCH resource sets, and the second time-frequency resource and the first time-frequency resource have a time-domain overlapping of at least one OFDM symbol.

In one embodiment, the second signal group comprises T signals, and the fifth bit block comprises indication information of whether each signal in the T signals is correctly received.

In one embodiment, the first signal group comprises M signals, and the third bit block comprises HARQ-ACK feedback information for each of the M signals.

In one embodiment, the second signal group comprises T signals, and the fifth bit block comprises HARQ-ACK feedback information for each of the T signals.

In one embodiment, steps in the box marked by F51 in FIG. 5 exist.

In one embodiment, steps in the box marked by F51 in FIG. 5 do not exist.

In one embodiment, steps in the box marked by F52 in FIG. 5 exist.

In one embodiment, steps in the box marked by F52 in FIG. 5 do not exist.

Embodiment 6

Figure 6:
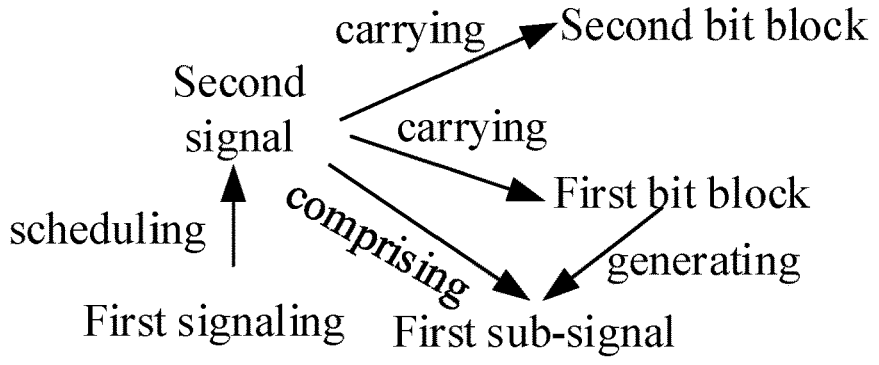
FIG. 6 illustrates a schematic diagram of relations among a first signaling, a second signal, a first bit block, a second bit block and a first sub-signal according to one embodiment of the present application.

Embodiment 6 illustrates a schematic diagram of relations among a first signaling, a second signal, a first bit block, a second bit block and a first sub-signal according to one embodiment of the present application, as shown in FIG. 6.

In embodiment 6, a first signaling comprises scheduling information of a second signal, the second signal carries a first bit block and a second bit block, the second signal comprises a first sub-signal, the first sub-signal is a signal generated by the first bit block through a first procedure, and the first procedure comprises channel coding.

In one embodiment, the first procedure comprises all or part of CRC Insertion, Segmentation, code block-level CRC Insertion, Channel Coding, Rate Matching, Concatenation, Scrambling, Modulation, Layer Mapping, Precoding, Mapping to Resource Element, OFDM Baseband Signal Generation and Modulation and Upconversion.

In one embodiment, the phrase of the second signal carrying a first bit block and a second bit block comprises that the second signal comprises a first sub-signal, and the first sub-signal is a signal generated by the first bit block through the first procedure.

In one embodiment, the phrase of the second signal carrying a first bit block and a second bit block comprises that the second signal comprises a signal generated by the second bit block through a second procedure.

In one subembodiment of the above embodiment, the second procedure comprises part or all of CRC insertion, Segmentation, code block-level CRC Insertion, Channel Coding, Rate Matching, Concatenation, Scrambling, Modulation, Layer Mapping, Precoding, Mapping to Resource Element, OFDM Baseband Signal Generation and Modulation and Upconversion.

Embodiment 7

Figure 7:
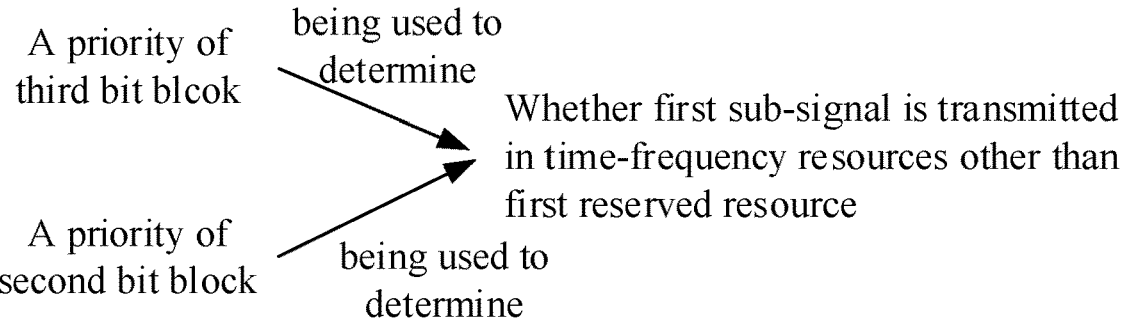
FIG. 7 illustrates a schematic diagram of relations among a priority of a third bit block, a priority of a second bit block and whether a first sub-signal is transmitted in time-frequency resources other than a first reserved resource according to one embodiment of the present application.

Embodiment 7 illustrates a schematic diagram of relations among a priority of a third bit block, a priority of a second bit block and whether a first sub-signal is transmitted in time-frequency resources other than a first reserved resource according to one embodiment of the present application, as shown in FIG. 7.

In embodiment 7, a priority of a third bit block and a priority of a second bit block are used together to determine whether a first sub-signal is transmitted in time-frequency resources other than a first reserved resource, and the first time-frequency resource in the present application comprises the first reserved resource.

In one embodiment, the first reserved resource comprises at least one reserved RE.

In one embodiment, the first reserved resource is reserved for transmitting HARQ-ACK information.

In one embodiment, the first reserved resource is reserved through the method of puncturing.

In one embodiment, a number of bit(s) comprised in the third bit block is greater than the first value in the present application; when the third bit block is a low priority and the second bit block is a high priority, the first sub-signal is only transmitted in the first reserved resource; otherwise, the first sub-signal is transmitted in time-frequency resources other than the first reserved resource.

In one subembodiment of the above embodiment, the first value is configured by a higher layer.

In one subembodiment of the above embodiment, the first value is pre-configured.

In one subembodiment of the above embodiment, the first value is equal to 2.

In one subembodiment of the above embodiment, the first value is a maximum number of bit(s) of the first information allowed to be transmitted in the first reserved resource, and the first information comprises HARQ-ACK feedback information.

In one subembodiment of the above embodiment, the phrase of the first sub-signal being transmitted in time-frequency resources other than the first reserved resource comprises that each signal in the first sub-signal is transmitted in time-frequency resources other than the first reserved resource.

In one subembodiment of the above embodiment, the phrase of the first sub-signal being transmitted in time-frequency resources other than the first reserved resource comprises that one part of signals in the first sub-signal is transmitted in the first reserved resource, and another part of signals in the first sub-signal is transmitted in time-frequency resources other than the first reserved resource.

In one embodiment, a number of bit(s) comprised in the third bit block is greater than the first value in the present application; when a priority of the third bit block is a low priority and a priority of the second bit block is a high priority, the first bit block in the present application comprises at least one bit generated by all or partial bits in the third bit block through the method of boundling, the first bit block is used to generate the first sub-signal, and the first sub-signal is only transmitted in the first reserved resource.

In one subembodiment of the above embodiment, the first value is higher-layer configured.

In one subembodiment of the above embodiment, the first value is pre-configured.

In one subembodiment of the above embodiment, the first value is equal to 2.

In one subembodiment of the above embodiment, the first value is a maximum number of bit(s) of the first information allowed to be transmitted in the first reserved resource, and the first information comprises HARQ-ACK feedback information.

In one embodiment, a number of bit(s) comprised in the third bit block is not greater than the first value in the present application; when a priority of the third bit block is a low priority and a priority of the second bit block is a high priority, the first bit block in the present application comprises the third bit block, the first bit block is used to generate the first sub-signal, and the first sub-signal is only transmitted in the first reserved resource.

In one embodiment, a number of bit(s) comprised in the third bit block is not greater than the first value in the present application; when a priority of the third bit block is a low priority and a priority of the second bit block is a low priority, the first bit block in the present application comprises the third bit block, the first bit block is used to generate the first sub-signal, and the first sub-signal is only transmitted in the first reserved resource.

In one embodiment, when a number of bit(s) comprised in the third bit block is not greater than the first value in the present application, the first bit block in the present application comprises the third bit block, the first bit block is used to generate the first sub-signal, and the first sub-signal is only transmitted in the first reserved resource.

In one embodiment, a number of bit(s) comprised in the third bit block is greater than the first value in the present application; when a priority of the third bit block is a low priority and a priority of the second bit block is a low priority, the first bit block in the present application comprises the third bit block, the first bit block is used to generate the first sub-signal, and all or partial bits in the first sub-signal are transmitted in time-frequency resources other than the first reserved resource.

In one embodiment, a number of bit(s) comprised in the third bit block is not greater than the first value in the present application; when a priority of the third bit block is a high priority, the first bit block in the present application comprises the third bit block, the first bit block is used to generate the first sub-signal, and all or partial bits in the first sub-signal are transmitted in time-frequency resources other than the first reserved resource.

In one embodiment, a number of bit(s) comprised in the third bit block is not greater than the first value in the present application; when a priority of the third bit block is a high priority, the first bit block in the present application comprises the third bit block, the first bit block is used to generate the first sub-signal, and the first sub-signal is only transmitted in the first reserved resource.

In one embodiment, a number of bit(s) comprised in the third bit block is greater than the first value in the present application; when a priority of the third bit block is a high priority, the first bit block in the present application comprises the third bit block, the first bit block is used to generate the first sub-signal, and partial or all signals in the first sub-signal are transmitted in time-frequency resources other than the first reserved resource.

In one embodiment, a number of bit(s) comprised in the third bit block is not greater than the first value in the present application; when a priority of the third bit block is a high priority, the first bit block in the present application comprises the third bit block, the first bit block is used to generate the first sub-signal, and the first sub-signal is only transmitted in a resource reserved for transmitting HARQ-ACK information with a high priority.

In one embodiment, the first reserved resource is a resource reserved for transmitting HARQ-ACK information with a low priority.

In one embodiment, the first reserved resource is a resource reserved for transmitting HARQ-ACK information.

Embodiment 8

Figure 8:
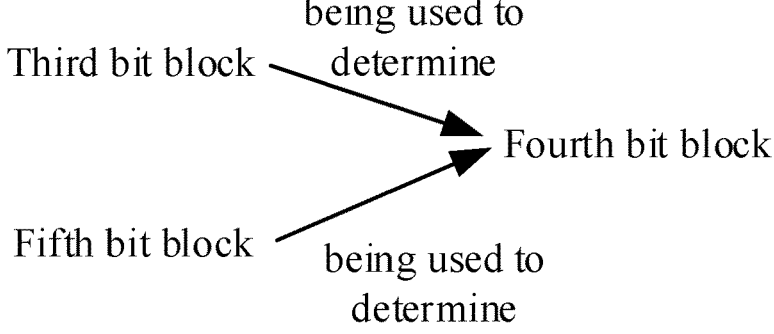
FIG. 8 illustrates a schematic diagram of relations among a second signal, a first bit block, a third bit block, a fourth bit block and a fifth bit block according to one embodiment of the present application.

Embodiment 8 illustrates a schematic diagram of relations among a second signal, a first bit block, a third bit block, a fourth bit block and a fifth bit block according to one embodiment of the present application, as shown in FIG. 8.

In embodiment 8, a second signal carries a first bit block and a fourth bit block, a fifth bit block is used to generate the fourth bit block, and the fifth bit block and the third bit block are used together to determine the first bit block.

In embodiment 8, a priority of the third bit block and a priority of the fifth bit block are different.

In one embodiment, the second signal comprises a signal generated by the fourth bit block after a third procedure.

In one subembodiment of the above embodiment, the third procedure comprises part or all of CRC insertion, Segmentation, code block-level CRC Insertion, Channel Coding, Rate Matching, Concatenation, Scrambling, Modulation, Layer Mapping, Precoding, Mapping to Resource Element, OFDM Baseband Signal Generation and Modulation and Upconversion.

In one embodiment, the fifth bit block is a HARQ-ACK CB, and for the generation method of the fifth bit block, refer to section 9.1 in TS38.213.

In one embodiment, a number of bit(s) comprised in the fifth bit block is used to select a second time-frequency resource group out of N time-frequency resource group(s).

In one subembodiment of the above embodiment, the N time-frequency resource group(s) is(are) N PUCCH resource set(s), and the second time-frequency resource group is one of the N PUCCH resource set(s).

In one embodiment, the fifth bit block and the third bit block are used together to determine a number of bit(s) comprised in the first bit block (a size of the first bit block).

In one embodiment, the fifth bit block is used to generate the fourth bit block through the method of boundling.

In one embodiment, all or partial bits in the fifth bit block generates the fourth bit block through logic and operation.

In one embodiment, the fourth bit block comprises the fifth bit block.

In one embodiment, the fourth bit block comprises and only comprises the fifth bit block.

In one embodiment, a number of bit(s) comprised in the fourth bit block is not greater than a number of bit(s) comprised in the fifth bit block.

In one embodiment, a sum of a number of bit(s) comprised in the first bit block (a size of the first bit block) and a number of bit(s) comprised in the fourth bit block is not greater than a second value.

In one subembodiment of the above embodiment, the second value is a higher-layer configured value.

In one subembodiment of the above embodiment, the second value is a pre-configured value.

In one embodiment, the third bit block is a low priority and the fifth bit block is a high priority; when a sum of a number of bit(s) comprised in the third bit block and a number of bit(s) comprised in the fifth bit block is greater than a second value, a number of bit(s) comprised in the first bit block (a size of the first bit block) is less than a number of bit(s) comprised in the third bit block.

In one subembodiment of the above embodiment, a number of bit(s) comprised in the fourth bit block is equal to a number of bit(s) comprised in the fifth bit block.

In one subembodiment of the above embodiment, the second value is a higher-layer configured value.

In one subembodiment of the above embodiment, the second value is a pre-configured value.

In one subembodiment of the above embodiment, a sum of a number of bit(s) comprised in the first bit block (a size of the first bit block) and a number of bit(s) comprised in the fourth bit block is equal to the second value.

In one embodiment, the third bit block is a low priority and the fifth bit block is a high priority; when a sum of a number of bit(s) comprised in the third bit block and a number of bit(s) comprised in the fifth bit block is not greater than a second value, the first bit block comprises the third bit block.

In one subembodiment of the above embodiment, the second value is a higher-layer configured value.

In one subembodiment of the above embodiment, the second value is a pre-configured value.

In one embodiment, the first bit block comprises at least one bit generated by all or partial bits in the third bit block through the method of boundling.

In one embodiment, the first node in the present application receives a second signaling group, the second signaling group comprises scheduling information of the second signal group, a third signaling is a last signaling in the second signaling group, the third signaling indicates a third time-frequency resource, and the third time-frequency resource and the first time-frequency resource are overlapping in time domain.

In one subembodiment of the above embodiment, each signaling in the second signaling group indicates transmitting feedback information in a second time-domain resource.

In one subembodiment of the above embodiment, each signaling in the second signaling group comprises a PDSCH-to-HARQ_feedback timing indicator, and the PDSCH-to-HARQ_feedback timing indicator is used to determine a second time-domain resource.

In one subembodiment of the above embodiment, the phrase of a third signaling being a last signaling in the second signaling group comprises that in time domain, a monitoring occasion of the third signaling is later than a monitoring occasion of a signaling other than the third signaling in the second signaling group.

In one subembodiment of the above embodiment, the phrase of a third signaling being a last signaling in the second signaling group comprises that in time domain, a monitoring occasion of the third signaling is not earlier than a monitoring occasion of a signaling other than the third signaling in the second signaling group.

In one subembodiment of the above embodiment, the phrase of a third signaling being a last signaling in the second signaling group comprises that in time domain, a last symbol of the third signaling is later than a last symbol of a signaling other than the third signaling in the second signaling group.

In one subembodiment of the above embodiment, the phrase of a third signaling being a last signaling in the second signaling group comprises that in time domain, a last symbol of the third signaling is not earlier than a last symbol of a signaling other than the third signaling in the second signaling group.

In one subembodiment of the above embodiment, the phrase of a third signaling being a last signaling in the second signaling group comprises that the second signaling group comprises multiple DCIs, the multiple DCIs indicate a same time for transmitting a PUCCH, and the third signaling is a last DCI in the second signaling group.

In one subembodiment of the above embodiment, the phrase of the third time-frequency resource and the first time-frequency resource having an overlapping in time domain comprises that the third time-frequency resource is a PUCCH, the first time-frequency resource is a PUSCH, the fifth bit block and the third signaling are used together to select the third time-frequency resource out of multiple PUCCH resource sets, and the third time-frequency resource and the first time-frequency resource have a time-domain overlapping of at least one OFDM symbol.

In one subembodiment of the above embodiment, the third time-frequency resource comprises at least one RE.

In one subembodiment of the above embodiment, the third time-frequency resource comprises at least one multi-carrier symbol in time domain, and the first time-frequency resource comprises at least one subcarrier in frequency domain.

In one embodiment, the first node in the present application receives a second signaling group, the second signaling group comprises scheduling information of the second signal group, a third signaling is a last signaling in the second signaling group, the third signaling indicates a third time-frequency resource, and the third time-frequency resource and the second time-frequency resource are overlapping in time domain.

In one subembodiment of the above embodiment, each signaling in the second signaling group indicates transmitting feedback information in a second time-domain resource.

In one subembodiment of the above embodiment, each signaling in the second signaling group comprises a PDSCH-to-HARQ_feedback timing indicator, and the PDSCH-to-HARQ_feedback timing indicator is used to determine a second time-domain resource.

In one subembodiment of the above embodiment, the phrase of a third signaling being a last signaling in the second signaling group comprises that in time domain, a monitoring occasion of the third signaling is later than a monitoring occasion of a signaling other than the third signaling in the second signaling group.

In one subembodiment of the above embodiment, the phrase of a third signaling being a last signaling in the second signaling group comprises that in time domain, a monitoring occasion of the third signaling is not earlier than a monitoring occasion of a signaling other than the third signaling in the second signaling group.

In one subembodiment of the above embodiment, the phrase of a third signaling being a last signaling in the second signaling group comprises that in time domain, a last symbol of the third signaling is later than a last symbol of a signaling other than the third signaling in the second signaling group.

In one subembodiment of the above embodiment, the phrase of a third signaling being a last signaling in the second signaling group comprises that in time domain, a last symbol of the third signaling is not earlier than a last symbol of a signaling other than the third signaling in the second signaling group.

In one subembodiment of the above embodiment, the phrase of a third signaling being a last signaling in the second signaling group comprises that the second signaling group comprises multiple DCIs, the multiple DCIs indicate a same time for transmitting a PUCCH, and the third signaling is a last DCI in the second signaling group.

In one subembodiment of the above embodiment, the phrase of the third time-frequency resource and the first time-frequency resource having an overlapping in time domain comprises that the third time-frequency resource is a PUCCH, the second time-frequency resource is a PUCCH, the fifth bit block and the third signaling are used together to select the third time-frequency resource out of multiple PUCCH resource sets, the third bit block and the second signaling are used together to select the second time-frequency resource out of multiple PUCCH resource sets, and the third time-frequency resource and the second time-frequency resource have a time-domain overlapping of at least one OFDM symbol.

In one subembodiment of the above embodiment, the third time-frequency resource comprises at least one RE.

In one subembodiment of the above embodiment, the third time-frequency resource comprises at least one multi-carrier symbol in time domain, and the first time-frequency resource comprises at least one subcarrier in frequency domain.

Embodiment 9

Figure 9:
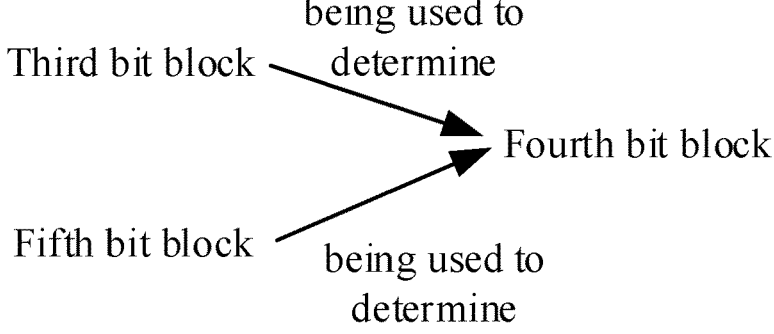
FIG. 9 illustrates a schematic diagram of relations among a third bit block, a fourth bit block and a fifth bit block according to one embodiment of the present application.

Embodiment 9 illustrates a schematic diagram of relations among a third bit block, a fourth bit block and a fifth bit block according to one embodiment of the present application, as shown in FIG. 9.

In embodiment 9, a fifth bit block and a third bit block are used together to determine a fourth bit block.

In one embodiment, the third bit block is a low priority and the fifth bit block is a high priority; when a sum of a number of bit(s) comprised in the third bit block and a number of bit(s) comprised in the fifth bit block is greater than a second value, a number of bit(s) comprised in the fourth bit block is less than a number of bit(s) comprised in the fifth bit block.

In one subembodiment of the above embodiment, a number of bit(s) comprised in the first bit block (a size of the first bit block) is equal to a number of bit(s) comprised in third bit block.

In one subembodiment of the above embodiment, the second value is a higher-layer configured value.

In one subembodiment of the above embodiment, the second value is a pre-configured value.

In one subembodiment of the above embodiment, a sum of a number of bit(s) comprised in the first bit block (a size of the first bit block) and a number of bit(s) comprised in the fourth bit block is equal to the second value.

In one embodiment, the third bit block is a low priority and the fifth bit block is a high priority; when a sum of a number of bit(s) comprised in the third bit block and a number of bit(s) comprised in the fifth bit block is not greater than a second value, the fourth bit block comprises the fifth bit block.

In one subembodiment of the above embodiment, the second value is a higher-layer configured value.

In one subembodiment of the above embodiment, the second value is a pre-configured value.

In one embodiment, the fourth bit block comprises at least one bit generated by all or partial bits in the fifth bit block through the method of boundling.

In one embodiment, the third bit block is a low priority and the fifth bit block is a high priority; when a sum of a number of bit(s) comprised in the third bit block and a number of bit(s) comprised in the fifth bit block is greater than a second value, a first parameter is used to determine a number of bit(s) comprised in the first bit block (a size of the first bit block) and a number of bit(s) comprised in the fourth bit block.

In one subembodiment of the above embodiment, the second value is a higher-layer configured value.

In one subembodiment of the above embodiment, the second value is a pre-configured value.

In one subembodiment of the above embodiment, the first parameter is used to constrain a ratio of a number of bit(s) comprised in the first bit block (a size of the first bit block) and a number of bit(s) comprised in the fourth bit block.

In one subembodiment of the above embodiment, the first parameter is used to constrain a maximum number of bit(s) comprised in the first bit block.

In one subembodiment of the above embodiment, the first parameter is used to constrain a maximum number of bit(s) comprised in the fourth bit block.

In one subembodiment of the above embodiment, the first parameter is used to constrain a difference value between a number of bit(s) comprised in the third bit block and a number of bit(s) comprised in the first bit block (a size of the first bit block).

In one subembodiment of the above embodiment, the first parameter is used to constrain a difference value between a number of bit(s) comprised in the fifth bit block and a number of bit(s) comprised in the fourth bit block.

Embodiment 10

Figures 10, 11, 12:
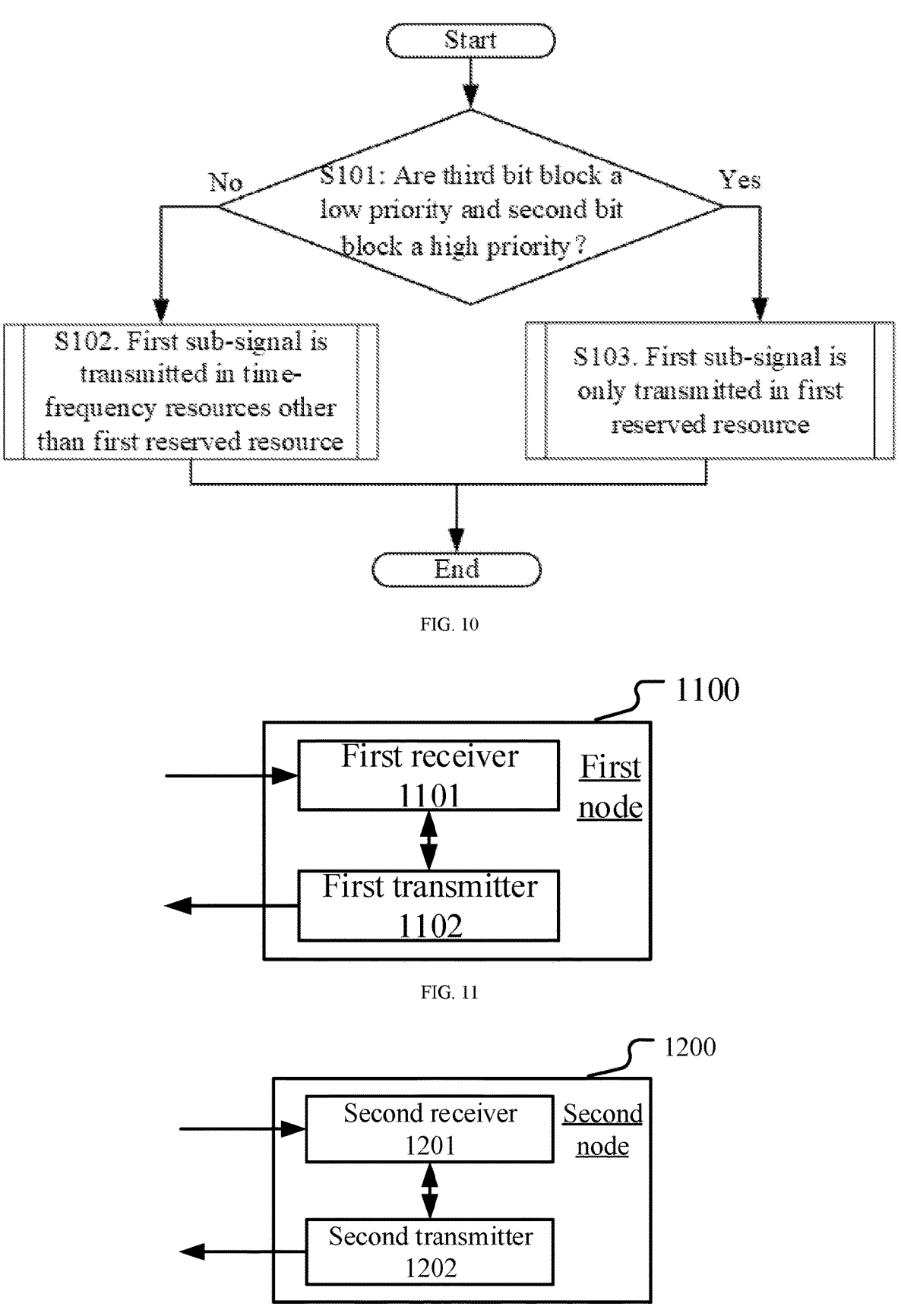
FIG. 10 illustrates a schematic diagram of judging whether a first sub-signal is transmitted in time-frequency resources other than a first reserved resource according to one embodiment of the present application.
FIG. 11 illustrates a structure block diagram of a processing device in a first node according to one embodiment of the present application.
FIG. 12 illustrates a structure block diagram of a processing device in a second node according to one embodiment of the present application.

Embodiment 10 illustrates a schematic diagram of judging whether a first sub-signal is transmitted in time-frequency resources other than a first reserved resource according to one embodiment of the present application, as shown in FIG. 10.

In embodiment 10, the first node in the present application judges whether the conditions of a third bit block being of low priority and a second bit block being of high priority are satisfied in step S101; if yes, judges that a first sub-signal is only transmitted in a first reserved resource in step S103; otherwise, judges whether a first sub-signal is transmitted in time-frequency resources other than a first reserved resource in step S102.

In embodiment 10, a number of bit(s) comprised in the third bit block is greater than a first value.

In one embodiment, the first value is higher-layer configured.

In one embodiment, the first value is pre-configured.

In one embodiment, the first value is equal to 2.

In one embodiment, the first value is a maximum number of bit(s) of the first information allowed to be transmitted in the first reserved resource.

In one subembodiment of the above embodiment, the first information comprises HARQ-ACK information.

In one subembodiment of the above embodiment, the first information comprises UCI.

In one embodiment, the phrase of the first sub-signal being transmitted in time-frequency resources other than the first reserved resource comprises that each signal in the first sub-signal is transmitted in time-frequency resources other than the first reserved resource.

In one embodiment, the phrase of the first sub-signal being transmitted in time-frequency resources other than the first reserved resource comprises that one part of signals in the first sub-signal is transmitted in the first reserved resource, and another part of signals in the first sub-signal is transmitted in time-frequency resources other than the first reserved resource.

In one embodiment, the first value is configured on an RRC layer.

Embodiment 11

Embodiment 11 illustrates a structure block diagram of a processing device in a first node according to one embodiment of the present application, as shown in FIG. 11. In FIG. 11, a processing device 1100 in a first node comprises a first receiver 1101 and a first transmitter 1102.

In embodiment 11, the first receiver 1101 receives a first signal group and a first signaling; the first transmitter 1102 transmits a second signal in a first time-frequency resource, and the second signal carries a first bit block and a second bit block.

In embodiment 11, the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the second signal comprises a first sub-signal, the first sub-signal is a signal generated by the first bit block after through a first procedure, the first procedure comprises channel coding.

In one embodiment, the first time-frequency resource comprises a first reserved resource, and a priority of the third bit block and a priority of the second bit block are used together to determine whether the first sub-signal is transmitted in time-frequency resources other than the first reserved resource.

In one embodiment, the first receiver 1101 receives a first signaling group; herein, the first signaling group comprises scheduling information of the first signal group, a second signaling is a last signaling in the first signaling group, the second signaling indicates a second time-frequency resource, and the second time-frequency resource is overlapping with the first time-frequency resource in time domain.

In one embodiment, the first receiver 1101 receives a second signal group; herein, the second signal carries a fourth bit block, a fifth bit block comprises indication information of whether a signal in the second signal group is correctly received, the fifth bit block is used to generate the fourth bit block, a priority of the third bit block and a priority of the fifth bit block are different, and the fifth bit block and the third bit block are used together to determine the first bit block.

In one embodiment, the fifth bit block and the third bit block are used together to determine the fourth bit block.

In one embodiment, a number of bit(s) comprised in the third bit block is greater than a first value; when the third bit block is a low priority and the second bit block is a high priority, the first sub-signal is only transmitted in the first reserved resource; otherwise, the first sub-signal is transmitted in time-frequency resources other than the first reserved resource.

In one embodiment, the first time-frequency resource is a PUSCH; the third bit block comprises HARQ-ACK information, and the second bit block comprises user data; a number of bit(s) comprised in the third bit block is greater than the first value; when the third bit block is a low priority and the second bit block is a high priority, the third bit block is used to generate the first bit block through the method of boundling, and the first sub-signal is only transmitted in the first reserved resource; otherwise, the first sub-signal is transmitted in time-frequency resources other than the first reserved resource.

In one embodiment, the first time-frequency resource is a PUSCH; the third bit block comprises HARQ-ACK information, and the second bit block comprises user data; a number of bit(s) comprised in the third bit block is greater than the first value; when the third bit block is a low priority and the second bit block is a high priority, the third bit block is used to generate the first bit block through the method of boundling, and a number of bit(s) comprised in the first bit block (a size of the first bit block) is equal to the first value; otherwise, a number of bit(s) comprised in the first bit block (a size of the first bit block) is greater than the first value.

In one embodiment, the first time-frequency resource is a PUSCH; the third bit block comprises HARQ-ACK information, and the second bit block comprises user data; a number of bit(s) comprised in the third bit block is greater than the first value; when the third bit block is a low priority and the second bit block is a high priority, the third bit block is used to generate the first bit block through the method of boundling, and a number of bit(s) comprised in the first bit block (a size of the first bit block) is equal to the first value, and the first sub-signal is transmitted in only the first reserved resource; otherwise, a number of bit(s) comprised in the first bit block (a size of the first bit block) is greater than the first value, and the first sub-signal is transmitted in time-frequency resources other than the first reserved resource.

In one embodiment, the first time-frequency resource is a PUSCH; the third bit block comprises HARQ-ACK information with a low priority, the fifth bit block comprises HARQ-ACK information with a high priority, and the second bit block comprises user data; the fourth bit block comprises the fifth bit block, and the fifth bit block and the third bit block are used together to determine the first bit block; when a sum of a number of bit(s) comprised in the first bit block (a size of the first bit block) and a number of bit(s) comprised in the fourth bit block is not greater than a second value, the first bit block comprises the third bit block; otherwise, a number of bit(s) comprised in the first bit block (a size of the first bit block) is equal to a difference value between the second value and a number of bit(s) comprised in the fourth bit block; herein, a number of bit(s) comprised in the fourth bit block is less than the second value, and the second value is a higher-layer configured value.

In one embodiment, the first time-frequency resource is a PUSCH, and a maximum number of bit(s) of the first bit block allowed to be carried on the PUSCH is greater than the first value; the third bit block comprises HARQ-ACK information, and the second bit block comprises user data; a number of bit(s) comprised in the third bit block is greater than the first value; when the third bit block is a low priority and the second bit block is a high priority, the third bit block is used to generated the first bit block through the method of boundling, and the first sub-signal is only transmitted in the first reserved resource; otherwise, the first sub-signal is transmitted in time-frequency resources other than the first reserved resource.

In one embodiment, the first time-frequency resource is a PUSCH, and a maximum number of bit(s) of the first bit block allowed to be carried on the PUSCH is greater than the first value; the third bit block comprises HARQ-ACK information, and the second bit block comprises user data; a number of bit(s) comprised in the third bit block is greater than the first value; when the third bit block is a low priority and the second bit block is a high priority, the third bit block is used to generated the first bit block through the method of boundling, and a number of bit(s) comprised in the first bit block (a size of the first bit block) is equal to the first value; otherwise, a number of bit(s) comprised in the first bit block (a size of the first bit block) is greater than the first value.

In one embodiment, the first time-frequency resource is a PUSCH, and a maximum number of bit(s) of the first bit block allowed to be carried on the PUSCH is greater than the first value; the third bit block comprises HARQ-ACK information, and the second bit block comprises user data; a number of bit(s) comprised in the third bit block is greater than the first value; when the third bit block is a low priority and the second bit block is a high priority, the third bit block is used to generate the first bit block through the method of boundling, and a number of bit(s) comprised in the first bit block (a size of the first bit block) is equal to the first value, and the first sub-signal is transmitted in only the first reserved resource; otherwise, a number of bit(s) comprised in the first bit block (a size of the first bit block) is greater than the first value, and the first sub-signal is transmitted in time-frequency resources other than the first reserved resource.

In one embodiment, the first time-frequency resource is a PUSCH, and a maximum number of bit(s) of the first bit block allowed to be carried on the PUSCH is greater than the first value; the third bit block comprises HARQ-ACK information with a low priority, the fifth bit block comprises HARQ-ACK information with a high priority, and the second bit block comprises user data; the fourth bit block comprises the fifth bit block, and the fifth bit block and the third bit block are used together to determine the first bit block; when a sum of a number of bit(s) comprised in the first bit block (a size of the first bit block) and a number of bit(s) comprised in the fourth bit block is not greater than a second value, the first bit block comprises the third bit block; otherwise, a number of bit(s) comprised in the first bit block (a size of the first bit block) is equal to a difference value between the second value and a number of bit(s) comprised in the fourth bit block; herein, a number of bit(s) comprised in the fourth bit block is less than the second value, and the second value is a higher-layer configured value.

In one embodiment, the first time-frequency resource is a PUSCH; the third bit block comprises HARQ-ACK information with a low priority, the fifth bit block comprises HARQ-ACK information with a high priority, and the second bit block comprises user data; the fifth bit block and the third bit block are used together to determine the first bit block and the fourth bit block; when a sum of a number of bit(s) comprised in the first bit block (a size of the first bit block) and a number of bit(s) comprised in the fourth bit block is not greater than a second value, the fourth bit block comprises the fifth bit block, and the first bit block comprises the third bit block; otherwise, a number of bit(s) comprised in the fourth bit block is not greater than a number of bit(s) comprised in the fifth bit block, and a number of bit(s) comprised in the first bit block (a size of the first bit block) is less than a number of bit(s) comprised in the third bit block; herein, the second value is a higher-layer configured value.

In one subembodiment of the above embodiment, when a number of bit(s) comprised in the fourth bit block is less than a number of bit(s) comprised in the fifth bit block, the fifth bit block is used to generate the fourth bit block through the method of boundling.

In one subembodiment of the above embodiment, when a number of bit(s) comprised in the first bit block (a size of the first bit block) is less than a number of bit(s) comprised in the third bit block, the third bit block is used to generate the first bit block through the method of boundling.

In one embodiment, the first node is a UE.

In one embodiment, the first node is a relay node.

In one embodiment, the first receiver 1101 comprises at least one of the antenna 452, the receiver 454, the receiving processor 456, the multi-antenna receiving processor 458, the controller/processor 459, the memory 460, or the data source 467 in embodiment 4.

In one embodiment, the first transmitter 1102 comprises at least one of the antenna 452, the transmitter 454, the transmitting processor 468, the multi-antenna transmitting processor 457, the controller/processor 459, the memory 460, or the data source 467 in embodiment 4.

Embodiment 12

Embodiment 12 illustrates a structure block diagram of a processing device in a second node according to one embodiment of the present application, as shown in FIG. 12. In FIG. 12, a processing device 1200 in a second node comprises a second receiver 1201 and a second transmitter 1202.

In embodiment 12, the second transmitter 1202 transmits a first signal group and a first signaling; the second receiver 1201 receives a second signal in a first time-frequency resource, and the second signal carries a first bit block and a second bit block.

In embodiment 12, the first signaling comprises scheduling information of the second signal, a third bit block comprises indication information of whether signal(s) in the first signal group is(are) correctly received, the third bit block is used to generate the first bit block, and a number of bit(s) comprised in the first bit block (a size of the first bit block) is not greater than a number of bit(s) comprised in the third bit block; a priority of the third bit block and a priority of the second bit block are used together to determine a number of bit(s) comprised in the first bit block (a size of the first bit block).

In one embodiment, the second signal comprises a first sub-signal, the first sub-signal is a signal generated by the first bit block after through a first procedure, the first procedure comprises channel coding.

In one embodiment, the first time-frequency resource comprises a first reserved resource, and a priority of the third bit block and a priority of the second bit block are used together to determine whether the first sub-signal is transmitted in time-frequency resources other than the first reserved resource.

In one embodiment, the second transmitter 1202 transmits a first signaling group; herein, the first signaling group comprises scheduling information of the first signal group, a second signaling is a last signaling in the first signaling group, the second signaling indicates a second time-frequency resource, and the second time-frequency resource is overlapping with the first time-frequency resource in time domain.

In one embodiment, the second transmitter 1202 transmits a second signal group; herein, the second signal carries a fourth bit block, a fifth bit block comprises indication information of whether a signal in the second signal group is correctly received, the fifth bit block is used to generate the fourth bit block, a priority of the third bit block and a priority of the fifth bit block are different, and the fifth bit block and the third bit block are used together to determine the first bit block.

In one embodiment, the fifth bit block and the third bit block are used together to determine the fourth bit block.

In one embodiment, a number of bit(s) comprised in the third bit block is greater than a first value; when the third bit block is a low priority and the second bit block is a high priority, the first sub-signal is only transmitted in the first reserved resource; otherwise, the first sub-signal is transmitted in time-frequency resources other than the first reserved resource.

In one embodiment, the second node is a UE.

In one embodiment, the second node is a relay node.

In one embodiment, the second node is a base station.

In one embodiment, the second receiver 1201 comprises at least one of the antenna 420, the receiver 418, the receiving processor 470, the channel decoder 478, the controller/processor 475, or the memory 476 in embodiment 4.

In one embodiment, the second transmitter 1202 comprises at least one of antenna 420, the transmitter 418, the transmitting processor 416, the channel encoder 477, the controller/processor 475, or the memory 476 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, tele-controlled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IOT terminals, Machine Type Communication (MTC) terminals, enhanced MTC (eMTC) terminals, data cards, network cards, vehicle-mounted communication equipment, low-cost mobile phones, low-cost tablets and other wireless communication devices. The base station or the systems in the present application includes but is not limited to the macro-cellular base stations, micro-cellular base stations, home base stations, relay base stations, gNBs (NR nodes B), Transmitting and Receiving Points (TRPs) and other wireless communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment for wireless communications, the user equipment comprising:
   a transceiver; and
   a processor, wherein the transceiver and the processor are configured to:
   receive a first signal group and a first signaling, wherein each signal in the first signal group is transmitted on a physical downlink shared channel (PDSCH), and wherein the first signaling is downlink control information (DCI), and
   transmit a second signal in a first time-frequency resource, wherein the second signal carries a first bit block and a second bit block, and wherein the first time-frequency resource is a time-frequency resource belonging to a physical uplink shared channel (PUSCH), and wherein the second bit block comprises user data, and
   wherein the first signaling comprises scheduling information of the second signal, and wherein a third bit block comprises indication information of whether one or more signal in the first signal group are correctly received, and wherein the third bit block is used to generate the first bit block, and wherein a first number of bit comprised in the first bit block is not greater than a second number of bit comprised in the third bit block,; and
   wherein the first bit block comprises hybrid automatic repeat request acknowledgement (HARQ-ACK), and wherein a priority of the third bit block and a priority of the second bit block are used together to determine the first number of bit.

2. The user equipment according to claim 1, wherein a-the second number of bit(s) comprised in the third bit block-is greater than a first value;, and
   wherein on a condition that a priority of the third bit block is a low priority and a priority of the second bit block is a high priority, first number of bit is equal to the first value, and
   wherein otherwise, the first number of bits is greater than the first value.

3. The user equipment according to claim 2, wherein a first reserved resource is a resource reserved for transmitting HARQ-ACK information, the first value is a maximum number of bits of first information allowed to be transmitted in the first reserved resource, and the first information comprises HARQ-ACK information; or, the first value is equal to 2.

4. The user equipment according to claim 2, wherein the third bit block comprises at least one HARQ-ACK bit, and wherein the first bit block comprises bits for at least one of HARQ-ACK information, a Part 1 channel state information (CSI) Report or a Part 2 CSI Report.

5. The user equipment according to claim 1, wherein on a condition that a priority of the third bit block is a high priority and a priority of the second bit block is a high priority, the first bit block comprises each of bit(s) in the third bit block, and the first number of bits is equal to the second number of bits, and
   wherein on a condition that a priority of the third bit block is a low priority and a priority of the second bit block is a low priority, the first bit block comprises each of bit(s) in the third bit block, and a the first number of bits is equal to a-the second number of bits.

6. The user equipment according to claim 1, wherein the second signal comprises a first sub-signal, the first sub-signal is a signal generated by the first bit block after through a first procedure, the first procedure comprises channel coding, and wherein the first time-frequency resource comprises a first reserved resource, and a priority of the third bit block and a priority of the second bit block are used together to determine whether the first sub-signal is transmitted in time-frequency resources other than the first reserved resource.

7. The user equipment according to claim 6, wherein a-the second number of bits is greater than a first value;, and wherein on a condition that the third bit block is a low priority and the second bit block is a high priority, the first sub-signal is only transmitted in the first reserved resource, and
   wherein otherwise, at least part of the first sub-signal is transmitted in time- frequency resources other than the first reserved resource.

8. The user equipment according to claim 1, wherein the transceiver and the processor are further configured to:
   receive a first signaling group, wherein each signaling in the first signaling group is transmitted on a physical downlink control channel (PDCCH), and
   wherein the first signaling group comprises scheduling information of the first signal group, and wherein a second signaling is a last signaling in the first signaling group, and wherein the second signaling indicates a second time-frequency resource, and wherein the second time-frequency resource is overlapping with the first time- frequency resource in time domain.

9. A base station for wireless communications, the base station comprising:

a transceiver; and a processor, wherein the transceiver and the processor are configured to:

transmit a first signal group and a first signaling, wherein each signal in the first signal group is transmitted on a physical downlink shared channel (PDSCH), and wherein the first signaling is downlink control information (DCI); and receive a second signal in a first time-frequency resource, wherein the second signal carries a first bit block and a second bit block, and wherein the first time-frequency resource is a time-frequency resource belonging to a physical uplink shared channel (PUSCH), and wherein the second bit block comprises user data;

wherein the first signaling comprises scheduling information of the second signal, and wherein a third bit block comprises indication information of whether one or more signals in the first signal group are correctly received, and wherein the third bit block is used to generate the first bit block, and wherein a first number of bits comprised in the first bit block is not greater than a second number of bits comprised in the third bit block, and wherein the first bit block comprises hybrid automatic repeat request acknowledgement (HARQ-ACK), and wherein a priority of the third bit block and a priority of the second bit block are used together to determine the first number of bits.

10. The base station according to claim 9, wherein a-the second number of bits is greater than a first value;, and wherein on a condition that a priority of the third bit block is a low priority and a priority of the second bit block is a high priority, the first number of bits is equal to the first value, and wherein otherwise, the first number of bits is greater than the first value.

11. The base station according to claim 10, wherein a first reserved resource is a resource reserved for transmitting HARQ-ACK information, the first value is a maximum number of bit of first information allowed to be transmitted in the first reserved resource, and the first information comprises HARQ-ACK information; or, the first value is equal to 2.

12. The base station according to claim 9, wherein on a condition that a priority of the third bit block is a high priority and a priority of the second bit block is a high priority, the first bit block comprises each of bit(s) in the third bit block, and the first number of bits is equal to the second number of bits, and wherein on a condition that a priority of the third bit block is a low priority and a priority of the second bit block is a low priority, the first bit block comprises each of bits in the third bit block, and the first number of bits is equal to the second number of bits, or, wherein the second signal comprises a first sub-signal, and wherein the first sub-signal is a signal generated by the first bit block after through a first procedure, and wherein the first procedure comprises channel coding, and wherein the first time-frequency resource comprises a first reserved resource, and wherein a priority of the third bit block and a priority of the second bit block are used together to determine whether the first sub-signal is transmitted in time- frequency resources other than the first reserved resource, and wherein second number of bits is greater than a first value, and wherein on a condition that the third bit block is a low priority and the second bit block is a high priority, the first sub-signal is only transmitted in the first reserved resource, and wherein otherwise, at least part of the first sub-signal is transmitted in time- frequency resources other than the first reserved resource.

13. A method in a user equipment for wireless communications, the method comprising:

receiving a first signal group and a first signaling, wherein each signal in the first signal group is transmitted on a physical downlink shared channel (PDSCH), the first signaling is downlink control information (DCI); and transmitting a second signal in a first time-frequency resource, wherein the second signal carries a first bit block and a second bit block, and wherein the first time-frequency resource is a time-frequency resource belonging to a physical uplink shared channel (PUSCH), and wherein the second bit block comprises user data, and wherein the first signaling comprises scheduling information of the second signal, and wherein a third bit block comprises indication information of whether one or more signal(s) in the first signal group are correctly received, the third bit block is used to generate the first bit block, and a first number of bit(s) comprised in the first bit block is not greater than a second number of bits comprised in the third bit block; and wherein the first bit block comprises hybrid automatic repeat request acknowledgement (HARQ-ACK), and wherein a priority of the third bit block and a priority of the second bit block are used together to determine the first number of bits.

14. The method in a user equipment according to claim 13, wherein the second number of bits is greater than a first value, and wherein on a condition that a priority of the third bit block is a low priority and a priority of the second bit block is a high priority, the first number of bits is equal to the first value, and wherein otherwise, the first number of bits is greater than the first value.

15. The method in a user equipment according to claim 14, wherein a first reserved resource is a resource reserved for transmitting HARQ-ACK information, the first value is a maximum number of bits of first information allowed to be transmitted in the first reserved resource, and the first information comprises HARQ-ACK information; or, the first value is equal to 2.

16. The method in a user equipment according to claim 14, wherein the third bit block comprises at least one HARQ-ACK bit, the first bit block comprises bits for at least one of HARQ-ACK information, a Part 1 CSI Report or a Part 2 CSI Report.

17. The method in a user equipment according to claim 13, wherein on a condition that a priority of the third bit block is a high priority and a priority of the second bit block is a high priority, the first bit block comprises each of bits in the third bit block, and the first number of bits is equal to the second number of bits; and wherein on a condition that a priority of the third bit block is a low priority and a priority of the second bit block is a low priority, the first bit block comprises each of bits in the third bit block, and the first number of bits is equal to the second number of bits.

18. The method in a user equipment according to claim 13, wherein the second signal comprises a first sub-signal, and wherein the first sub-signal is a signal generated by the first bit block after through a first procedure, and wherein the first procedure comprises channel coding, and wherein the first time-frequency resource comprises a first reserved resource, and wherein a priority of the third bit block and a priority of the second bit block are used together to determine whether the first sub-signal is transmitted in time- frequency resources other than the first reserved resource.

19. The method in a user equipment according to claim 18, wherein the second number of bits is greater than a first value, and wherein on a condition that the third bit block is a low priority and the second bit block is a high priority, the first sub-signal is only transmitted in the first reserved resource, and wherein otherwise, at least part of the first sub-signal is transmitted in time- frequency resources other than the first reserved resource.

20. The method in a user equipment according to claim 13, comprising:

receiving a first signaling group;-, wherein each signaling in the first signaling group is transmitted on a physical downlink control channel (PDCCH), and wherein the first signaling group comprises scheduling information of the first signal group, and wherein a second signaling is a last signaling in the first signaling group, and wherein the second signaling indicates a second time-frequency resource, and wherein the second time-frequency resource is overlapping with the first time- frequency resource in time domain.

\* \* \* \* \*